United States Patent [19]
Boyer et al.

[11] 3,994,434
[45] Nov. 30, 1976

[54] VARIABLE VOLUME AIR DAMPER CONTROL HAVING A DAMPED ACTUATOR

[75] Inventors: George C. Boyer; Lawrence M. Peterson, both of Rockford, Ill.

[73] Assignee: Barber-Colman Company, Rockford, Ill.

[22] Filed: Sept. 4, 1975

[21] Appl. No.: 610,123

[52] U.S. Cl. .................................. 236/49; 91/47; 251/47
[51] Int. Cl.² ........................................ F24F 13/10
[58] Field of Search ............... 251/47, 48; 91/47; 236/49; 200/83 T

[56] References Cited
UNITED STATES PATENTS

| | | |
|---|---|---|
| 1,552,100 | 9/1925 | Waters .............................. 251/48 X |
| 1,658,577 | 2/1928 | Smoot .............................. 251/48 X |
| 1,772,403 | 8/1930 | Smoot .............................. 91/47 X |
| 2,080,212 | 5/1937 | Otto .............................. 91/47 X |
| 2,414,754 | 1/1947 | Malek .............................. 251/47 X |
| 2,985,374 | 5/1961 | Jensen .............................. 91/47 X |
| 3,081,847 | 3/1963 | Smitley .............................. 251/48 X |
| 3,809,314 | 5/1974 | Engelke et al. ........................ 236/49 |
| 3,934,796 | 1/1976 | Smith, Jr. et al. ..................... 236/16 |

Primary Examiner—William E. Wayner
Assistant Examiner—William E. Tapolcai, Jr.
Attorney, Agent, or Firm—A. Richard Koch

[57] ABSTRACT

A control for a damper providing a variable volume air flow through a duct in response to a sensed condition has means for damping oscillations of the damper.

11 Claims, 1 Drawing Figure

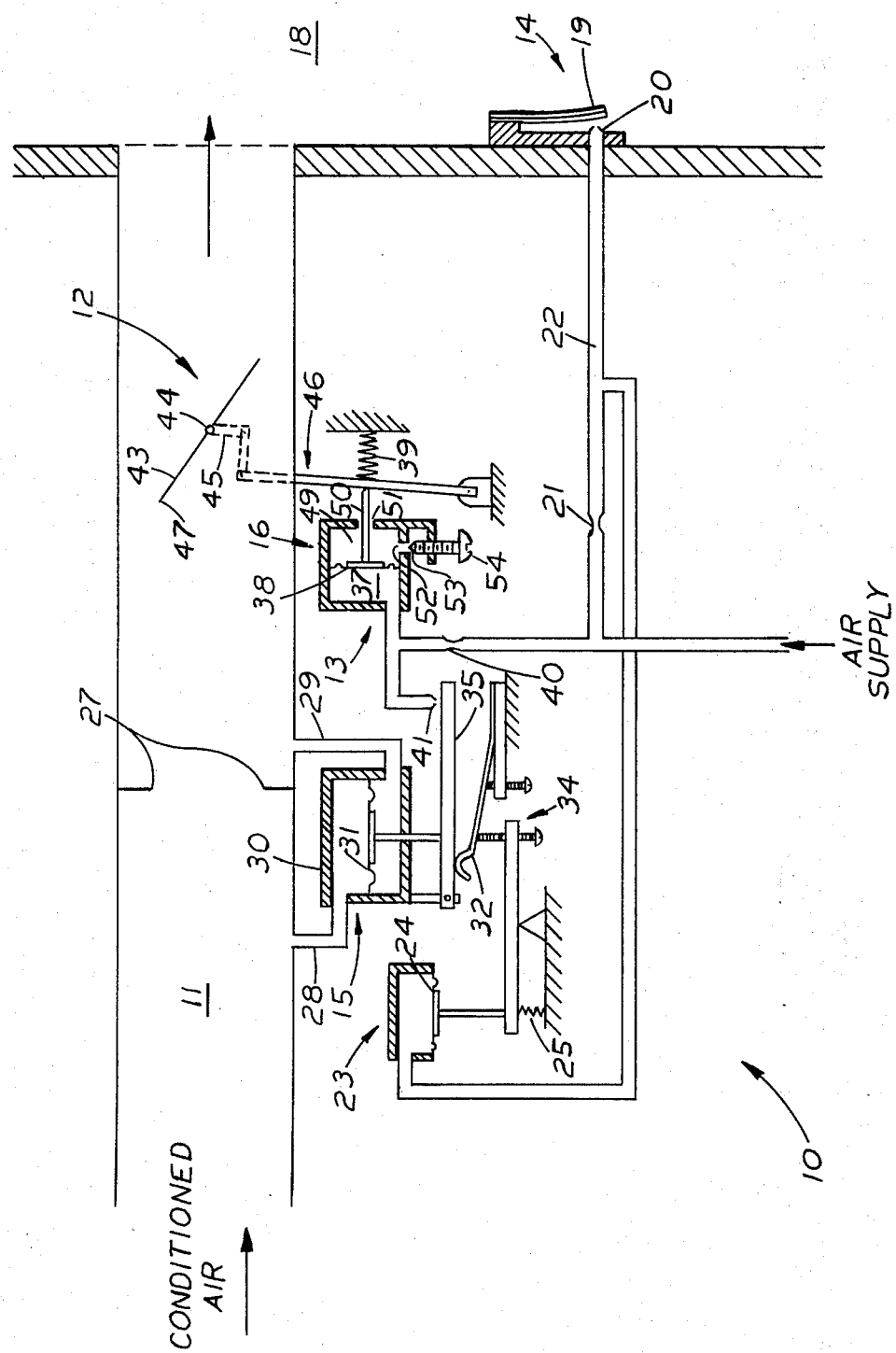

VARIABLE VOLUME AIR DAMPER CONTROL HAVING A DAMPED ACTUATOR

BACKGROUND OF THE INVENTION

This invention relates to devices of the type which control the flow of conditioned air through a duct into a controlled space in response to a sensed condition such as temperature, humidity, and the like.

In such devices an air damper in the duct is operated by an actuator in response to the sensed condition. In more sophisticated proportioning installations, the volume flow of air is controlled in response to the sensed condition. The volume flow of air is maintained constant at any one sensed demand for conditioned air and changes only in response to a change in sensed demand. The position of the damper in response to a sensed demand for conditioned air is varied in response to a sensed flow of conditioned air through the duct to maintain the volume flow constant. Since flow is a function of pressure difference, it may be measured as a function of the difference in pressure between two different locations along the stream of air, preferably above and below a restriction.

When the sensed condition or the condition set point changes, the sensed demand changes, resulting in the actuator repositioning the damper to permit fulfillment of the new demand by increasing or decreasing the flow of conditioned air. This change in air flow through the duct results in a sensed difference in the flow, which difference acts on the damper through the actuator to maintain the flow constant. The change in sensed demand for conditioned air and the sensed change in flow thus counteract each other, producing an oscillatory movement of the damper, permitting flow of alternately more and less air as first one and then the other of the sensed values predominates. The oscillation of the damper not only produces undesirable fluctuation in air flow into the controlled space, but also produces corresponding fluctuating changes in upstream air pressure. Changes in upstream air pressure affect flow through other ducts supplied from the same source of conditioned air, so that dampers in these other ducts may also begin to oscillate. This produces undesired fluctuating air flows into the spaces supplied by these ducts. Furthermore, the resulting changes in damper positions produce a cumulative affect on upstream pressure to further accentuate the oscillations. The undesired affects therefore may be both progressive and cumulative. Until now, no solution to this serious problem has been available.

SUMMARY OF THE INVENTION

According to the present invention the speed of the actuator positioning the damper is limited, thereby slowing the repositioning of the damper to reduce the tendency to produce original oscillations of the damper. The means for slowing actuator motion also slows motion of the damper resulting from upstream air pressure fluctuations, thereby damping secondary oscillations of the damper.

BRIEF DESCRIPTION OF THE DRAWING

The drawing shows a schematic view of a preferred pneumatic embodiment of the invention.

DESCRIPTION OF A PREFERRED EMBODIMENT

As shown in the drawing, a variable volume air control 10 comprises a duct 11 provided with a damper 12 positioned by an actuator 13 in response to a combined condition signal from condition sensor 14 and a sensed air flow signal from a flow sensor 15, and characterized by a damping means 16.

The duct 11 is connected to deliver conditioned air from a source (not shown) at the left to a controlled space 18. The conditon sensor 14 is located in the controlled space and is shown as comprising a laminated flapper 19 movable in response to changes in a sensed condition in the space to variably close a bleed nozzle 20. The nozzle is connected through a restriction 21 to a supply of air (not shown) at a constant pressure, a compartment 22 between the nozzle and restriction supplying a condition variable pneumatic signal in response to varying positions of the flapper with respect to the nozzle. The condition variable pneumatic signal is fed into a pneumatic pressure-mechanical motion transducer 23, where it is converted into a condition variable mechanical signal by moving a flexible diaphragm 24, the movement of which is opposed by a spring 25.

In duct 11 is an orifice 27 producing a drop in air pressure as air flows through it. An upstream pressure tap 28 and a downstream pressure tap 29 deliver the relatively high and low pressures on opposite sides of the orifice to a differential pneumatic pressure - mechanical motion transducer 30, where they act upon opposite sides of a flexible diaphragm 31 to produce a flow variable mechanical signal by moving the diaphragm in opposition to a spring 32, flow being a function of pressure difference.

The condition and flow variable signals are combined in a system of levers 34 responding to movements of the diaphragms 24, 31 to produce movement of a flapper 35 as a composite mechanical movement signal.

The actuator 13 is shown as comprising a variable volume cylinder 37 having a wall 38, shown as a flexible diaphragm, movable in opposition to an opposing force, such as spring 39, by variations in air pressure in the cylinder. Air is delivered to cylinder 37 from a constant pressure air supply (not shown) through a restriction 40. Air is bled from the cylinder through nozzle 41, the flow through which is controlled by flapper 35. The composite mechanical motion signal produced by flapper 35 is therefore converted into a composite pneumatic pressure signal to which actuator 13 responds.

Damper 12 comprises a blade 43 rotatable on pivot 44 by an arm 45, fixed to the blade and movable by actuator 13 through a lever system 46 to position the blade. Blade 43 is automatically biased toward closed position if the pivot is near or below the center of the blade, producing a force transmitted through arm 45 and lever system 46 to the actuator 13, where it opposes the pneumatic composite signal. It assists and may even replace spring 39. The bias varies with damper position and air pressure.

Not only an unbalanced force on the upstream side of the blade, but also a partial vacuum created by air flow downstream from the upper end 47 of the blade, creates the biasing torque on the blade. Any change in air flow, whether caused by the repositioning of the damper by acutator 13, or by a change in upstream pressure, will produce a change in the bias due to the variation in the partial vacuum responsive to air flow. The transmission of this variable bias to the actuator may result in oscillations in the damper position, producing undesirable fluctuations in flow of the conditioned air into the controlled space. The oscillations of the damper also produce fluctuations in upstream air pressure, which may result in oscillations of other dampers in other ducts receiving conditioned air from the same source. The results of these oscillations by a plurality of dampers is cumulative, accentuating the undesired fluctuations in flow of conditioned air into a plurality of controlled spaces. This tendency for the damper to oscillate is, according to our invention eliminated or greatly reduced by damping means 16.

As shown, the damping means 16 comprises a chamber 49, one wall of which is the movable wall 38 of actuator 13. A reciprocable rod 50, transmitting motion from the movable wall to the lever system 46, passes through an opening 51 in the chamber. The clearance between the rod and the opening provides a restriction to the passage of air into and out from the chamber in response to changes in the position of the movable wall 38. A separate restriction, shown as a port 52, may be made adjustable, as by a needle 53 positioned by a screw 54. The separate restriction may supplement or replace the clearance as a restriction. The essential feature is that the restriction be small enough to prevent movement of the movable wall with such rapidity as to cause oscillations in the position of the damper 12, yet large enough to permit repositioning of the damper within an acceptable period of time.

The described embodiment is exemplary only and does not define the limits of the invention. It will be obvious to those skilled in the art that substitutions and modifications may be made without departing from the spirit of the invention. It is not necessary that the movable wall 38 be common to both actuator 13 and damping means 16. The damping means could be remote from the actuator as long as it served the same function. The sensors 14, 15 could produce condition and flow variable electrical signals which could be combined to produce a composite electrical signal by use of well-known electrical or electronic equivalents of the pneumatic and mechanical components described. The actuator would then be a solenoid or an electric motor driven actuator. While the actuator 16 is described as employing ambient air as the damping fluid, any low-viscosity fluid, such as oil or water, could be used along with a suitable sump. It will further be obvious that, when the actuator 13 and damping means 16 are separate, the rod 50 need not pass through the chamber 49. A lever could replace reciprocating rod 50 as a transmitter of motion. The limits of the invention are defined by the claims.

We claim:

1. A variable volume control for a damper regulating flow of conditioned air through a duct into a controlled space in reponse to a sensed condition, said control comprising an actuator for positioning said damper, a flow sensor producing a flow variable signal in response to sensed air flow in the duct, a condition sensor producing a condition variable signal in response to the sensed condition, means for combining said flow and condition variable signals into a composite signal, said actuator movable in response to the composite signal, and means for damping movement of said damper; said means for damping comprising a chamber, means forming a movable wall of said chamber, and means for restricting flow of a fluid into and out from said chamber in response to movement of the wall, said wall movable by the actuator in response to said composite signal.

2. A control according to claim 1 wherein said movable wall is common to the actuator.

3. A control according to claim 2 wherein said actuator comprises a cylinder variable in volume in response to said composite signal.

4. A control according to claim 3 wherein said composite signal is pneumatic.

5. A control according to claim 1 wherein said means forming said movable wall comprises a flexible diaphragm.

6. A control according to claim 1 wherein said fluid is air.

7. A control according to claim 1 wherein the restrictive means is adjustable to vary the flow of said fluid.

8. A control according to claim 1 additionally comprising a member movable by the movable wall and passing through an opening in said chamber, the restrictive means comprising the clearance between said member and said opening.

9. A variable volume control for regulating flow of conditioned air into a controlled space in response to a sensed condition, said control comprising a duct for delivery of conditioned air to the space, a damper for regulating the flow of air through said duct, an actuator for positioning said damper, a flow detector producing a flow variable signal in response to sensed air flow in the duct, a condition sensor producing a condition variable signal in response to the sensed condition, means for combining said flow and condition variable signals into a composite signal, said actuator movable in response to the composite signal, and means for damping movement of said damper; said means for damping comprising a chamber, means forming a movable wall of said chamber, and means for restricting flow of a fluid into and out from said chamber in response to movement of the wall, said wall movable by the actuator in response to said composite signal.

10. A variable control for a damper regulating the volume flow of conditioned air through a duct into a controlled space in response to a sensed condition, said control comprising an actuator for positioning said damper, a flow sensor producing a flow variable signal in response to sensed air flow in the duct, a condition sensor producing a condition variable signal in response to a sensed condition, means for combining said flow and condition variable signals into a composite signal, said actuator movable in response to the composite signal, and means for damping movement of said damper; said means for damping comprising a chamber, means forming a movable wall of said chamber, means movable by the movable wall and passing through an opening in said chamber, and means comprising the clearance between said member and said opening for restricting flow of a fluid into and out from the chamber in response to movement of the wall.

11. A variable control for a damper regulating the volume flow of conditioned air through a duct into a controlled space in response to a sensed condition, said control comprising an actuator for positioning said damper, a flow sensor producing a flow variable signal in response to sensed air flow in the duct, a condition sensor producing a condition variable signal in response to a sensed condition, means for combining said flow and condition variable signals into a composite signal, said actuator movable in response to the composite signal, and means for damping movement of said damper; said means for damping comprising a chamber, means forming a movable wall of said chamber, and adjustable means for restricting flow of a fluid into and out from said chamber in response to movement of the wall.

* * * * *

UNITED STATES PATENT OFFICE
CERTIFICATE OF CORRECTION

Patent No. 3,994,434　　　　　　　　Dated November 30, 1976

Inventor(s)　George C. Boyer and Lawrence M. Peterson

It is certified that error appears in the above-identified patent and that said Letters Patent are hereby corrected as shown below:

Column 3, line 53, after "regulating" insert

--the volume--

Signed and Sealed this

Fifteenth Day of February 1977

[SEAL]

*Attest:*

RUTH C. MASON
*Attesting Officer*

C. MARSHALL DANN
*Commissioner of Patents and Trademarks*